United States Patent

[11] 3,554,287

[72] Inventors Louis H. Eilers;
 Christ F. Parks, Tulsa, Okla.
[21] Appl. No. 592,333
[22] Filed Nov. 7, 1966
[45] Patented Jan. 12, 1971
[73] Assignee The Dow Chemical Company
 Midland, Mich.
 a corporation of Delaware

[54] GELABLE COMPOSITION, RESULTING GELLED POLYMER COMPOSITION AND USE THEREOF
 1 Claim, No Drawings
[52] U.S. Cl. .................................................. 166/295,
 260/29.2, 260/29.6, 252/8.55
[51] Int. Cl. ..................................................... C09k 3/10,
 E21b 33/00
[50] Field of Search ..........................................
 260/29.6HN, 29.6O, 29.6M, 29.6BM, 29.6B, 29.2;
 166/33, 295

[56] References Cited
 UNITED STATES PATENTS
2,671,022 3/1954 Sargent et al. ................ 260/29.6(B)
2,842,338 7/1958 Davis et al. ................... 166/33
3,086,588 4/1963 Wahl et al. .................... 166/33
3,067,161 12/1962 Roth ............................. 260/29.6(O)
3,238,141 3/1966 Gatza ........................... 260/29.6(O)
3,306,870 2/1967 Eilers et al. .................. 260/29.6(EMN)

*Primary Examiner*—Murray Tillman
*Assistant Examiner*—Wilbert J. Briggs, Sr.
*Attorneys*—Griswold and Burdick and C. W. Carlin

ABSTRACT: A fluid gelable composition, which sets autonomously to a water-swellable resilient solid, comprising:
 (A) a sufficiently water-soluble salt of a selected metal in a specified minimum amount;
 (B) water in an amount sufficient to make 100 parts by weight of water and said salt;
 (C) a selected water-dispersible synthetic polymer in an amount sufficient to yield a gel with said brine, said gel being as in ASTM D 555-58 and method of use of said composition to provide a fluidtight seal in underground passageways including the space between the exposed face of a geologic formation and a well casing, tunnel, shaft, or retaining wall.

GELABLE COMPOSITION, RESULTING GELLED POLYMER COMPOSITION AND USE THEREOF

The invention is an improved gelable composition and the method of use thereof for sealing off openings against fluid flow.

In our copending application S.N. 371,665, filed June 1, 1964, an aqueous-based polyacrylamide sealant composition was described which can be pumped into place as desired and which thereafter will gel to a hard, tough, resilient solid which is highly resistant to the passage of fluids. Such composition consists essentially of an acrylamide polymer and an aqueous solution of an inorganic hydroxide or an inorganic salt, particularly a solution of both a divalent metal salt, e.g. $CaCl_2$, and a polyvalent (of a valence greater than two) metal salt, e.g. $FeCl_3$.

The present invention has general application to sealing off a void or space, against the entrance into or passage through, of encroaching water and brines, which exists between the wall of a subterranean formation and the casing or liner of a well shaft, tunnel, or other excavation penetrating or carved from a formation. It has special application to large-diameter shafts extending into subterranean formations including those comprising salt strata through which personnel, equipment, and materials are raised and lowered. It is highly effective against the flow of aqueous solutions and dispersions because it swells upon contact by water.

The present invention is a method of closing off openings or passageways, and composition required to be used therefor, consisting essentially of (A) an aqueous solution of a water-soluble monovalent or polyvalent (including divalent) metal salt or mixture of such salts, which when admixed with pure water, as a test of suitability therefor, results in an aqueous tension (also known as the vapor pressure of water and aqueous solutions) of less than 12 millimeters of mercury, (B) water, and (C) a water-dispersible synthetic polymer, which will produce a viscosity of at least about 10 centipoises when 1 percent by weight is admixed with water at room temperature, illustrative of which are polyvinyl alcohol, polyvinylpyrrolidone, polyvinylmorpholinone, polyvinyloxazolidinone, polyvinylalkyloxazolidinones, polyethylene oxide, polyvinyltoluene sulfonate, polystyrene sulfonate, water-soluble salts of any of the above polymers, and polymers of maleic anhydride copolymerized with any one of vinylmorpholinone, vinylpyrrolidone, vinyl acetate, vinylbenzene sulfonate, or vinylbenzylsulfonate. Water-soluble halides, sulfates, acetates, formates, phosphates, and nitrates of Na, K, Li, $NH_4$, Ca, Mg, Sr, Fe, Zn, Al, Sn, and Cu are illustrative of salts to use. Among such salts are $CaCl_2$, $MgCl_2$, $SrCl_2$, $FeCl_3$, $AlCl_3$, LiCl, KF, NaI, KI, $SnCl_4$, $CH_3COOK$, $CH_3COONH_4$, $Mg(NO_3)_2$, $K_2CO_3$, $Al_2(NO_3)_3$, $SnCl_2$, $CuSO_4$, and mixtures and hydrates of such salts.

A simple and acceptable test to employ to ascertain the desired amount of a polymer in a selected salt solution is determined by adding from 10 to 75 grams of a selected polymer per 100 milliliters of salt solution and choosing that amount of salt which yields a gel time of from 0.1 to 48 hours at 80° or 150° F.

The gel time is that determined by the standard gel test designated ASTM D555-58, the gel time being taken as the lapse of time between admixture of the polymer with the solution in a specified size and weight test tube and the time at which the gelation of the contents has progressed sufficiently to permit the test tube, together with the contents, to be suspended from a glass rod, which had been immersed therein prior to gel, and then held in air suspended from the glass rod, in accordance with said standard test as described in ASTM Standards (1958) Part 8, Sections 50 and 51, page 263, under "Gel Time of Drying Oils".

Methods of preparing the polymers employed in the practice of the invention are known. They are most commonly prepared by dissolving the selected monomer or mixture of monomers in an aqueous medium in the presence of a free-radical polymerization catalyst, e.g. a peroxide or a persulfate, or by subjecting the monomeric mixture to irradiation, e.g. cobalt 60 or high energy electrons which may be produced by a Vandergraaf electron accelerator.

Where a sulfonated polymer is desired, sulfonation is effectuated by the use of such agents as $H_2SO_4$ or $SO_3$. Where the sodium salt of a polymer is desired, the polymer may be reacted with NaOH.

The following examples are illustrative of the practice of the invention. Examples were conducted by preparing an aqueous salt solution of a given concentration and admixing therewith the amount of previously prepared polymer stated in Tables I to VI, infra.

The gel time of each polymer-aqueous salt mixture was obtained according to ASTM D555-58, as previously described and recorded in hours in tables. When certain of the sodium salt forms of the polymer were employed, e.g. sodium styrene sulfonate or the polymer containing the maleic anhydride half amide, there was present an excess of OH ions which necessitated addition of a small amount of hydrochloric acid to lower the pH value.

TABLE I

| Example No. | Polymer employed | Concentration of polymer in lb./gal. of aqueous salt solution | Temperature in °F. | Salt employed in aqueous solution | Concentration of salt in weight percent of aqueous salt solution | Gel time in hours |
|---|---|---|---|---|---|---|
| 1 | Sodium polystyrene sulfonate | 3 | 80 | $ZnCl_2$ | 45 | 0.5 |
| 2 | do | 3 | 150 | $ZnCl_2$ | 60 | 0.1 |
| 3 | Polyvinyl pyrrolidine | 6 | 80 | $ZnCl_2$ | 20 | 2.0 |
| 4 | do | 5 | 150 | $ZnCl_2$ | 60 | 4.0 |
| 5 | Polyethyleneoxide | 6 | 80 | $ZnCl_2$ | 70 | 0.05 |
| 6 | Polyvinyl alcohol | 3.5 | 80 | $ZnCl_2$ | 60 | 1.0 |
| 7 | do | 4 | 150 | $ZnCl_2$ | 70 | 0.05 |
| 8 | Polyvinyl morpholinone | 3 | 80 | $ZnCl_2$ | 60 | 0.2 |
| 9 | do | 3 | 150 | $ZnCl_2$ | 60 | 0.1 |
| 10 | Copolymer of vinylacetate, and maleic anhydride half amide | 6 | 80 | $ZnCl_2$ | 40 | 17.0 |
| 11 | do | 3 | 150 | $ZnCl_2$ | 60 | 0.1 |

TABLE II

| Example No. | Polymer employed | Concentration of polymer in lb./gal. of aqueous salt solution | Temperature in °F. | Salt employed in aqueous solution | Concentration of salt in weight percent of aqueous salt solution | Gel time in hours |
|---|---|---|---|---|---|---|
| 12 | Sodium polystyrene sulfonate | 5 | 80 | $CaCl_2$ | 40 | 24.0 |
| 13 | do | 5 | 150 | $CaCl_2$ | 40 | 1.5 |
| 14 | Polyvinyl pyrrolidone | 6 | 80 | $CaCl_2$ | 20 | 2.0 |
| 15 | do | 5 | 150 | $CaCl_2$ | 25 | 48.0 |
| 16 | Polyethylene oxide | 6 | 80 | $CaCl_2$ | 50 | 7.0 |
| 17 | do | 6 | 150 | $CaCl_2$ | 50 | 0.2 |
| 18 | Polyvinyl alcohol | 2.5 | 80 | $CaCl_2$ | 40 | 1.0 |
| 19 | do | 4 | 150 | $CaCl_2$ | 50 | 0.05 |
| 20 | Polyvinyl morpholinone | 6 | 80 | $CaCl_2$ | 50 | 0.2 |
| 21 | do | 6 | 150 | $CaCl_2$ | 50 | 0.1 |
| 22 | Copolymer of vinyl acetate and maleic anhydride half amide | 6 | 80 | $CaCl_2$ | 20 | 0.5 |
| 23 | do | 6 | 150 | $CaCl_2$ | 25 | 13.0 |

TABLE III

| Example No. | Polymer employed | Concentration of polymer in lb./gal. of aqueous salt solution | Temperature in °F. | Salt mixture employed in aqueous salt solution | Concentration of salts in weight percent aqueous solution | Gel time in hours |
|---|---|---|---|---|---|---|
| 24 | Sodium polystyrene sulfonate | 5 | 80 | $CaCl_2$ and $ZnCl_2$ | 17.1 of each (34.2 total) | 48.0 |
| 25 | do | 5 | 150 | Same | do | 8.0 |
| 26 | Polyvinyl pyrrolidinone | 6 | 80 | do | 25.6 of each (51.2 total) | 14.0 |
| 27 | do | 6 | 150 | do | do | 1.2 |
| 28 | Polyethylene oxide | 6 | 80 | do | ³ 28.5 of each (57 total) | 0.15 |
| 29 | do | 6 | 150 | do | do | 0.05 |
| 30 | Polyvinyl alcohol | 4 | 80 | do | do | 0.15 |
| 31 | do | 4 | 150 | do | do | 0.05 |
| 32 | Copolymer of vinyl acetate and maleic anhydride half amide | 6 | 80 | do | 20 of each (40 total) | 2.25 |
| 33 | do | 6 | 150 | do | do | 0.1 |

TABLE IV

| Example No. | Polymer employed | Concentration of polymer in lb./gal. of aqueous salt solution | Temperature in °F. | Salt employed in aqueous salt solution | Concentration of salt in weight percent of aqueous solution | Gel time in hours |
|---|---|---|---|---|---|---|
| 34 | Sodium polystyrene sulfonate | 5 | 80 | Potassium acetate | 25 | 0.5 |
| 35 | do | 5 | 150 | do | 70 | 0.1 |
| 36 | Polyvinyl pyrrolidone | 5 | 80 | do | 40 | 3.0 |
| 37 | do | 6 | 150 | do | 50 | 0.5 |
| 38 | Polyethylene oxide | 5 | 80 | do | 60 | 18.0 |
| 39 | do | 3 | 150 | do | 70 | 0.1 |
| 40 | Polyvinyl alcohol | 4 | 80 | do | 50 | 16 |
| 41 | do | 3.5 | 150 | do | 70 | 24 |
| 42 | Polyvinyl morpholinone | 5 | 80 | do | 60 | 16 |
| 43 | do | 5 | 150 | do | 60 | 2 |
| 44 | Copolymer of vinyl acetate and maleic anhydride half amide | 5 | 80 | do | 20 | 48.0 |
| 45 | do | 6 | 150 | do | 25 | 14.0 |

TABLE V

| Example No. | Polymer employed | Concentration of polymer in lb./gal. of aqueous salt solution | Temperature in °F. | Salt employed in aqueous salt solution | Concentration of salt in weight percent of aqueous solution | Gel time in hours |
|---|---|---|---|---|---|---|
| 46 | Sodium polystyrene sulfonate | 5 | 80 | $K_2CO_3$ | 70 | 5.0 |
| 47 | do | 5 | 150 | $K_2CO_3$ | 70 | 0.1 |
| 48 | Polyvinyl pyrrolidone | 5 | 80 | $K_2CO_3$ | 60 | 8.0 |
| 49 | do | 4 | 150 | $K_2CO_3$ | 70 | 4.0 |
| 50 | Polyethylene oxide | 5 | 80 | $K_2CO_3$ | 60 | 12.0 |
| 51 | do | 4 | 150 | $K_2CO_3$ | 70 | 0.1 |
| 52 | Polyvinyl alcohol | 4 | 80 | $K_2CO_3$ | 40 | 0.1 |
| 53 | do | 4 | 150 | $K_2CO_3$ | 40 | 0.05 |
| 54 | Copolymer of vinyl acetate and maleic anhydride half amide | 5 | 80 | $K_2CO_3$ | 30 | 24.0 |
| 55 | do | 5 | 150 | $K_2CO_3$ | 30 | 0.2 |

TABLE VI

| Example No. | Polymer employed | Concentration of polymer in lb./gal. of aqueous salt solution | Temperature in °F. | Salt employed in aqueous salt solution | Concentration of salt in weight percent of aqueous solution | Gel time in hours |
|---|---|---|---|---|---|---|
| 56 | Polyvinyl pyrrolidone | 6 | 80 | $CaCl_2$ and $FeCl_3$ | 24.2 $CaCl_2$ and 2.6 $FeCl_3$ (26.8) | 3.0 |
| 57 | do | 6 | 150 | Same | Same | 0.1 |
| 58 | Polyvinyl alcohol | 4 | 80 | do | 28.3 $CaCl_2$ and 3.0 $FeCl_3$ (31.3) | 0.5 |
| 59 | do | 4 | 150 | do | 37.7 $CaCl_2$ and 4.0 $FeCl_3$ (41.7) | 0.15 |
| 60 | Copolymer of vinyl acetate and maleic anhydride half amide | 6 | 80 | do | 13.2 $CaCl_2$ and 1.4 $FeCl_3$ (14.6) | 12.0 |
| 61 | do | 6 | 150 | do | Same | 0.5 |

Reference to the examples set out in Tables I to VI shows that a satisfactory gel is obtained by the use of any of the various combinations of a polymer dispersed in the aqueous salt solutions employed in the examples. The Tables further show that the gel rate, in general, is accelerated by a higher temperature, and by certain gel-salt combinations, e.g. polyethylene oxide, polyvinyl alcohol, or polyvinylmorpholinone with $ZnCl_2$ or a mixture of $ZnCl_2$ and $CaCl_2$ or $FeCl_3$ and $CaCl_2$. It shows, in general, that the gel rate is slower at a given temperature and employing a selected polymer and salt at higher salt concentrations.

It is suggested that preliminary test trials be conducted prior to a large-scale plugging or sealing job, to ascertain the best combination of polymer and salt and the concentrations thereof to produce a gelled plug within the desired time. Such tests can conveniently be conducted in a suitable small disposable container or vessel wherein the temperature and time of gel are observed.

At higher temperatures, almost instantaneous gels can be obtained by employing selected polymers and salts e.g. polyethylene oxide with $ZnCl_2$ or with mixtures of 2, and $FeCl_3$, or $ZnCl_2$ $3)_3$, CaCl

EXAMPLES 62 TO 65

The purpose of these examples was to demonstrate the high tensile strength of the gelled composition of the invention and its efficacy to plug off or provide a seal against fluid flow. The examples were conducted by preparing aqueous salt dispersions of selected polymers, similarly, as in the examples of Tables I to VI, supra, employing the aqueous salt solution of the concentration shown in Table VII, infra, and the number of grams of polymer, per 100 milliliters of aqueous salt solution, set out in Table VII.

Each fluid composition so made was placed in a 12-inch long, 1-inch diameter steel pipe at 76° F., where it gelled. After 24 hours, each gelled composition in the pipe section was subjected to hydraulic pressure (water under measured pressure introduced into one end of the pipe against the gelled composition). The pressure at which the so introduced water either moved past or through the gelled composition or caused the gelled composition to move as a slug was recorded as the yield strength value of the composition.

The yield strength values of various compositions of the invention are set out in Table VII.

TABLE VII

| Ex. No. | Aqueous salt solution in percent by weight of salt | Polymer in grams per 100 ml. of aqueous salt solution | Yield strength in p.s.i.g. |
| --- | --- | --- | --- |
| 62 | 35% $CaCl_2$ | 60 gms. sodium polystyrene sulfonate. | 900 |
| 63 | 50% $CaCl_2$ | 75 gms. polyethylene oxide | 600 |
| 64 | 60% $ZnCl_2$ | 50 gms. polyvinyl alcohol | 100 |
| 65 | 35% $ZnCl_2$ | 75 gms. vinyl pyrrolidone maleic anhydride copolymer. | 500 |

Reference to Table VII shows the high yield strength values of the composition of the invention and its efficacy as a sealant or plug against the flow of water or aqueous solutions.

One embodiment of the invention encompasses flowing separate streams of a nonaqueous dispersion of the polymer and of an aqueous solution of the salt to the locus where the seal is desired. As the streams meet and mix by normal turbulence, gelation occurs either immediately or after a desired lapse of time.

Any water-dispersible synthetic polymer, prepared from a monomeric mix containing a vinyl-bearing monomer may be employed in the invention if a 1 percent by weight solution thereof in water yields a viscosity of at least about 10 centipoises. Between about 0.3 and 6.0 pounds of polymer per gallon of brine are preferred.

We claim:

1. The method of sealing an opening between the wall of a subterranean formation and liner of a hole penetrating said formation, the liner being selected from the class consisting of well casings, shaft liners, excavations and mine shoring, retaining walls, foundations and footings for buildings, and tunnel liners, which method comprises:

A. emplacing in said opening a fluid gelable composition that sets autonomously to a water-swellable resilient solid which is highly resistant to the passage of water and aqueous solutions and dispersions therethrough said composition comprising:

1. a water-soluble salt in an amount capable of lowering the vapor pressure of water to a value not greater than about 12 millimeters of mercury and selected from the class consisting of (a) halides of metals selected from the class consisting of Ca, Fe, Al and Zn and (b) acetates and carbonates of any of said metals and Li, K, Na, and $NH_4$ and hydrates and (c) mixtures of any of said salts and hydrates;
   2. water in sufficient amount to make 100 parts by weight of brine with said water-soluble salt;
   3. a selected water-dispersible synthetic polymer in an amount sufficient to provide between about 3 pounds and about 6 pounds of polymer per gallon of brine to yield a gel with said brine, said gel being defined by the standard test designated ASTM D555-58, said synthetic polymer being selected from the class consisting of polymerized homopolymers of sodium styrenesulfonate, vinylpyrrolidone, ethylene oxide, vinylmorpholinone, mixtures thereof, and copolymers consisting of at least one monomer selected from the class above and vinyl acetate copolymerized with at least one other monomer selected from the class consisting of maleic anhydride and maleic half amides, and B. maintaining said composition in place for a time sufficient for it to set so emplaced to said water-swellable resilient solid to provide a seal against the passage of water and aqueous solutions through said opening.

PO-1050
(5/69)

UNITED STATES PATENT OFFICE
CERTIFICATE OF CORRECTION

Patent No. 3,554,287          Dated    12 January 1971

Inventor(s)    Louis H. Eilers and Christ F. Parks

It is certified that error appears in the above-identified patent and that said Letters Patent are hereby corrected as shown below:

In column 5, line 22, delete "2" and insert -- $CaCl_2$ --; in line 2 delete "3)$_3$, CaCl" and insert -- and $CaCl_2$. --

Signed and sealed this 11th day of May 1971.

(SEAL)
Attest:

EDWARD M. FLETCHER, JR.          WILLIAM E. SCHUYLER, J
Attesting Officer                 Commissioner of Patent